Feb. 4, 1930. R. A. BRENNECKE 1,745,400
CONDENSER
Filed Aug. 31, 1925  2 Sheets-Sheet 1
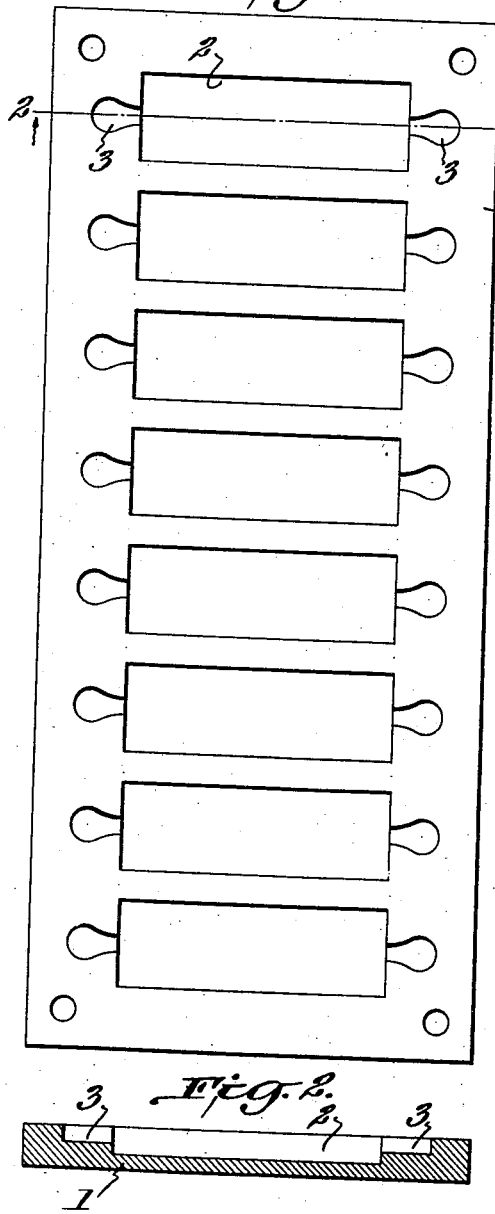
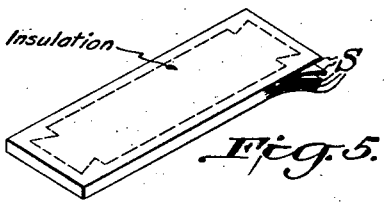
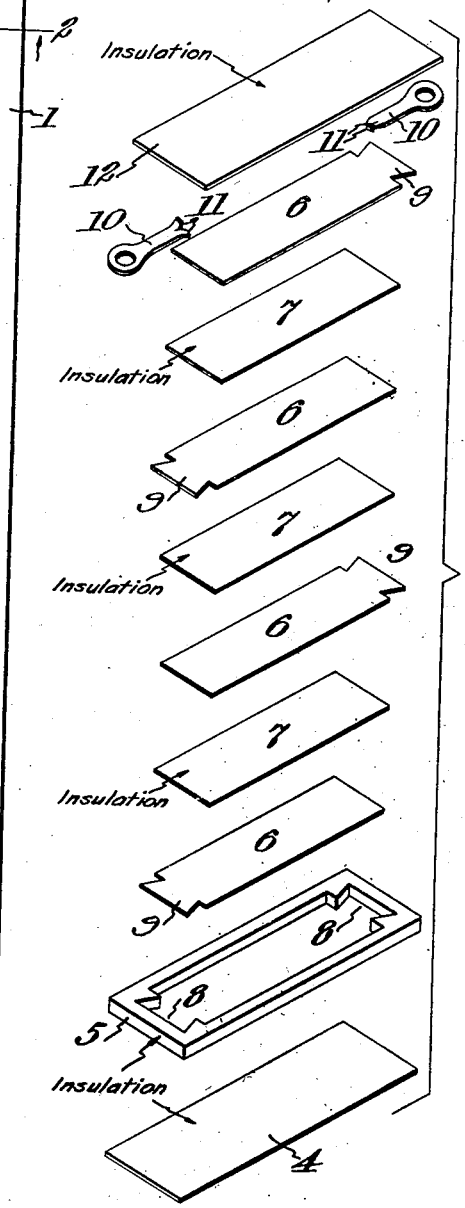
INVENTOR:
Robert A. Brennecke,
BY
ATTORNEYS.

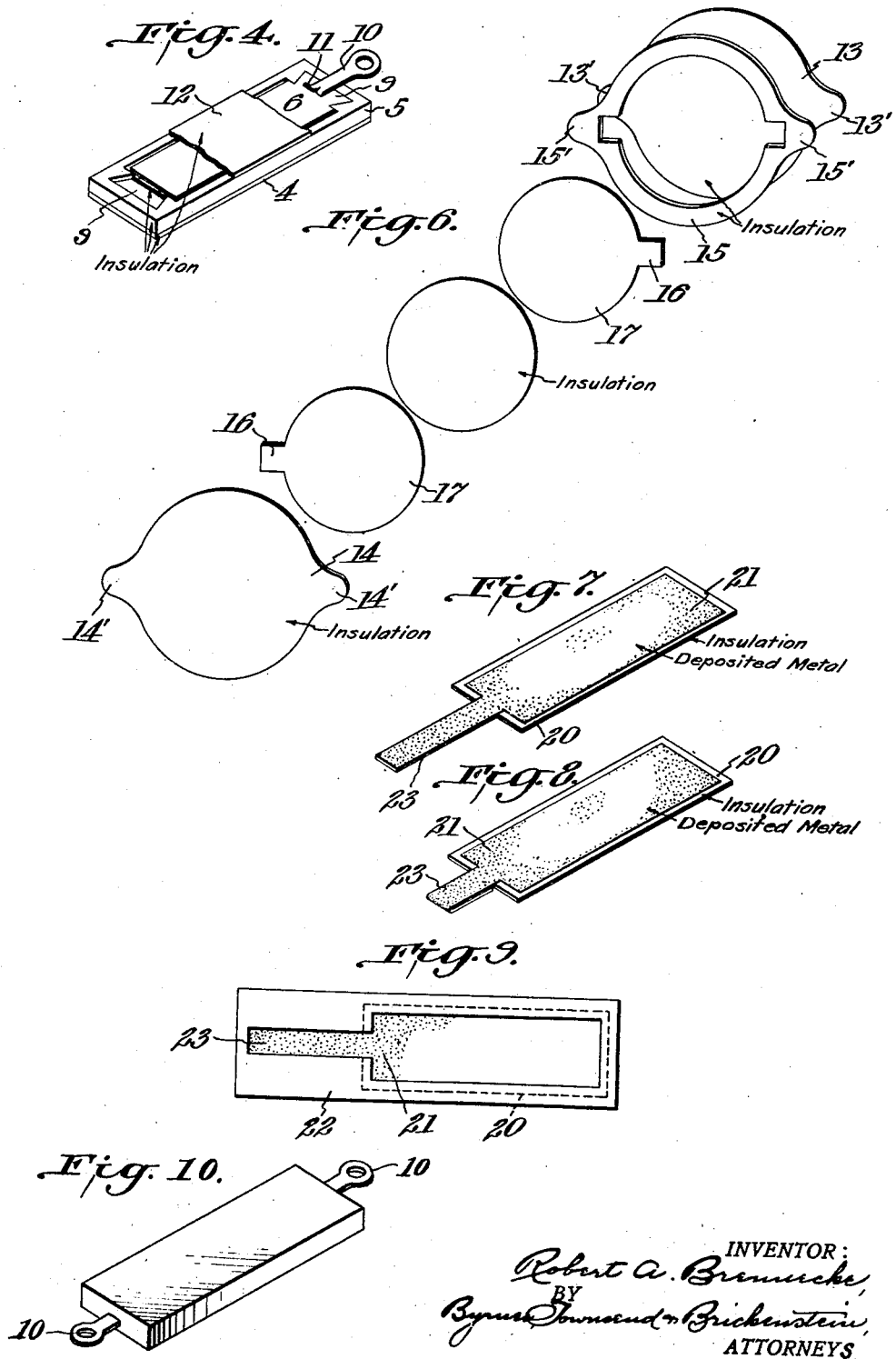

Patented Feb. 4, 1930

1,745,400

UNITED STATES PATENT OFFICE

ROBERT A. BRENNECKE, OF WHITE PLAINS, NEW YORK

CONDENSER

Application filed August 31, 1925. Serial No. 53,659.

This invention relates to electrical condensers and in particular to comparatively small condensers such as are employed in radio equipment.

Condensers of this type are frequently made by assembling the conducting strips and insulating strips alternately in forms or racks, clamping the assembled strips together, removing them as a unit from the forms, and then uniting the assembly by riveting terminal lugs thereto or by embedding the assembled strip and terminal lugs in a plastic composition.

According to the present invention, the several strips and the terminal lugs are assembled in a form which serves as a shell or case for the condenser, and preferably the forms are placed, and the condenser is assembled, in the mold in which the parts of the condenser are to be formed into a unitary structure.

An object of the invention is to provide a simple and economical process for manufacturing condensers, and one which will avoid any chance of improperly assembling the parts of the condenser. A further object is to provide a process which includes the assembling of the several conducting and insulating layers by a stamping or pressing operation. More specifically, an object is to provide a process employing forms made of a plastic material, such as paper impregnated with a reactive phenolic resin, and in which process the forms and strips are assembled in the molds in which the condenser is completed by uniting the parts under the influence of heat and pressure applied to the impregnated forms, the condenser elements remaining flat during the process of uniting the assembly, and any tendency toward buckling of the plates during that process being overcome. Other objects of the invention are to provide condenser parts of novel shape and composition, which parts may be quickly and accurately assembled and united by the novel process.

For a full understanding of the invention, reference is had to the acocmpanying drawings, in which Fig. 1 is a plan view of the lower section of a mold in which the condenser parts may be assembled and united, Fig. 2 is a vertical section through the mold as taken on line 2—2 of Fig. 1, Fig. 3 is an expanded perspective view illustrating the parts of a condenser and their relative order of assembly in a mold, Fig. 4 is a broken perspective view of the assembled parts, Fig. 5 is a perspective view of a composite sheet of insulation which may be employed, Fig. 6 is an expanded perspective of a modified form of condenser, Figs. 7 and 8 are perspective views of a modified form of combined conducting and insulating strip, Fig. 9 is a plan view of coated sheet and stencil, and Fig. 10 is a perspective view of one form of completed condenser.

In the drawings the mold which is indicated by the numeral 1 is preferably a gang mold having a series of cavities 2 formed in the upper surface thereof and of such shape and size as to receive the parts of a condenser. As shown the general outline of the cavities is substantially that of a rectangle with lateral extensions 3 for receiving the terminal lugs, the lug receiving extension 3 being of less depth than the rectangular portion of the cavity.

In assembling the parts of a condenser, a bottom form member 4 is first placed in the mold cavity, and then a form member 5 having the shape of an open frame within which the conducting strips 6 and insulating strips 7 may be arranged. The ends of the opening in the member 5 terminate in dovetail or outwardly flaring extensions 8 for receiving similarly shaped extensions 9 formed in one end only of the conducting strips 6. The strips 6 are arranged with the flared ends alternately at opposite ends of the form member 5, and the body portion of the strips 6 are of less length than the rectangular portion of the opening in the frame 5. The insulating strips 7 are of such size as to fit rather snugly within the main portion of the opening in the form and thus overlie both sides and one end of the conducting strips.

When a sufficient number of layers have been built up to provide the desired capacity, terminal lugs 10 are placed at the ends of the mold and with their outer ends lying in the extensions 3 of the mold cavity. The lugs 10 are preferably formed as stampings from sheet metal and have prongs 11 which project above and below the surface of the lug. The lugs are of such length that they terminate within the respective extensions 8 of the form member 5 and the prongs 11 thereof overlie the extensions 9 of the conducting strips 6. With the terminal lugs 10 in position the assembly of the condenser parts is completed by placing a cover number 12 over the frame member 5.

The form members 4, 5, and 12 are preferably formed of material which will unite and harden upon the application of heat and pressure, and may be, for example, blotting paper impregnated or coated with a reactive phenolic resin, that is, a phenol resin which will be transformed by sufficient application of heat or heat and pressure to an infusible resinoid body as is now well understood in the art. Instead of employing a single sheet for the form members, I may use any number of layers in building up the top, bottom and frame members to the desired thickness, and may of course make the frame integral with either closure. As shown in Fig. 5, the stock from which the members are punched or cut may comprise a number of layers of thin paper S, the several layers being coated or impregnated with varnish, preferably a reactive phenolic resin varnish, which are superposed before the varnish is completely dry; or the form members may be made from partially or fully cured laminated stock, or molded from standard molding mixtures, as may be desired. This laminated material is of especial advantage for use as the central or frame member 5 which forms the sides of the condenser since a thickness corresponding to that of the condenser plates and intermediate insulation may be readily obtained. The laminated sheet may, of course, be punched to any desired shape, and may be pre-cured to any desired extent. The conducting strips 6 may comprise stampings from metal foil or from thin sheet metal, and the insulating strips 7 may be of suitable insulating material, such as paper coated or impregnated with a phenolic resin, sheet mica, etc.

When assembled as illustrated in Fig. 4, the several parts are acted upon to hold the parts together. According to the preferred method, as already described the various layers are bonded together in the mold which served as a form for assembling the same, by the application of heat and pressure. One example of such a completed condenser formed by uniting the assembly by the application of heat and pressure is shown in Fig. 10.

As will be apparent from Fig. 6, the invention is not limited to any particular size or shape of the parts. As shown in this figure, the cover members 13, 14, and the central frame member 15 are of generally circular shape, having diametrically opposed extensions 13', 14', 15', respectively, for housing the terminals 16 on the conducting disks 17. The intermediate insulating layer or layers 18 is of circular shape. Terminal lugs such as the lugs 10 may be employed or I may employ rivets or screws passing through the extensions 13', 14', 15 and the strip terminals 16.

Another embodiment of my invention comprises a condenser composed of a series of insulating sheets 20 each of which is coated on one side with a conductor 21. The sheets may be made of any suitable insulating material but I prefer to use paper impregnated with a reactive phenolic resin. The metallic coating may be produced by spraying metal upon the paper, as by means of a Schoop gun, or by any of the other known methods. I may, of course, coat a large sheet of insulating material with metal and subsequently punch out elements of the proper size and shape. Moreover, it may be desirable that the metal coating should not extend to the edges of the insulating elements which are to be used in the condenser. If the metal is to be sprayed upon the insulator the desired parts may be protected by a stencil 22, which may be either single or arranged in a gang if a large sheet is to be prepared.

I may assemble such insulating sheets having a metallic coating on one side into a condenser in the manner described above. In the preferred method of assembly I place a sheet or sheets of heavy paper, impregnated with a reactive phenolic resin, in the bottom of a mold. Above this I place an open frame or wall of the same material. Within this frame I place a number of the above described metal-coated insulating sheets, and cover the whole with impregnated paper like that forming the bottom and side walls. The mold is then closed and subjected to heat and pressure which converts the assembly into a unit which is thoroughly insulated and not affected by moisture.

I may make connections to the alternate elements of the condenser in any suitable manner. That which I prefer is to provide each element with an integral projection or tang 23 on one end only. This may readily be done when the metal-coated insulating sheet is stamped to the desired shape and size. Alternate elements are arranged with these projections extending in opposite directions and a recess is provided in each end of the wall or frame to receive them. The top and bottom elements of the condenser as well as the mold itself of course conform to this shape. The corresponding superposed projections at each end are connected together by folding back a portion of each, as shown in Fig. 8. This folded portion thus presents a metalized surface which contacts with the unfolded portion of the adjacent element. This connection may be improved by passing a small metal pin through the projecting portions together or by placing a metal contact strip having vertically extending prongs beneath the top covering of the condenser and extending beyond the wall thereof. The pressure of the mold forces the prongs of this metal contact strip into intimate engagement with the already contacting projections on the condenser elements, and also causes a better contact between these projections.

It should be understood that the above are merely specific examples of my invention, and that considerable variations may be made in the structure and assembly without departing from the spirit thereof.

What I claim is:—

1. The process of making an electrical condenser which comprises forming a frame member of insulating material having therein a cavity adapted to receive condenser plates and dielectric material; assembling within said frame cavity a plurality of alternately arranged conducting condenser plates and insulating dielectric layers; applying insulating closure means to said frame cavity; and uniting said assembly into an integral, homogeneous structure including said frame member and said closure means by the application of heat and pressure.

2. The process of making an electrical condenser which comprises forming a frame member of insulating phenolic resin composition material having therein a cavity adapted to receive condenser plates and dielectric material; assembling within said frame cavity a plurality of alternately arranged conducting condenser plates and insulating dielectric layers; applying insulating closure means of phenolic resin composition material to said frame cavity; and uniting said assembly into an integral, homogeneous structure including said frame member and said closure means by the application of heat and pressure.

3. The process of forming a condenser which comprises assembling a plurality of conducting and insulating strips in a frame member having an opening therethrough of such size and shape as to receive and position the strips, placing cover members at the top and bottom of said frame member, and securing the parts in assembled position.

4. The method of assembling an electrical condenser which comprises placing alternate conducting and non-conducting layers within an insulating frame, closing said frame by insulating sheets, and uniting the whole by heat and pressure.

5. The method of molding an electrical condenser which comprises assembling alternate conducting and non-conducting layers within a frame of phenol resin material, applying closure elements of phenol resin material to said frame, and subjecting the whole to heat and pressure.

6. An electrical condenser comprising an insulating frame having therethrough an opening provided with a pair of lateral extensions, a plurality of alternately arranged conducting and insulating sheets within the opening of said frame, each of said insulating sheets having an extension thereon and the extensions of adjacent sheets being positioned within different extensions of the opening of said frame, terminal lugs overlying the respective sets of conducting sheet extensions, covers for said frame, and means maintaining said parts in assembled relation.

In testimony whereof, I affix my signature.

ROBERT A. BRENNECKE.